May 19, 1936.  C. A. GRIBBLE  2,041,542
APPARATUS FOR REMOVING CANDLE WAX FROM HOLDERS
Filed Aug. 3, 1934  2 Sheets-Sheet 1
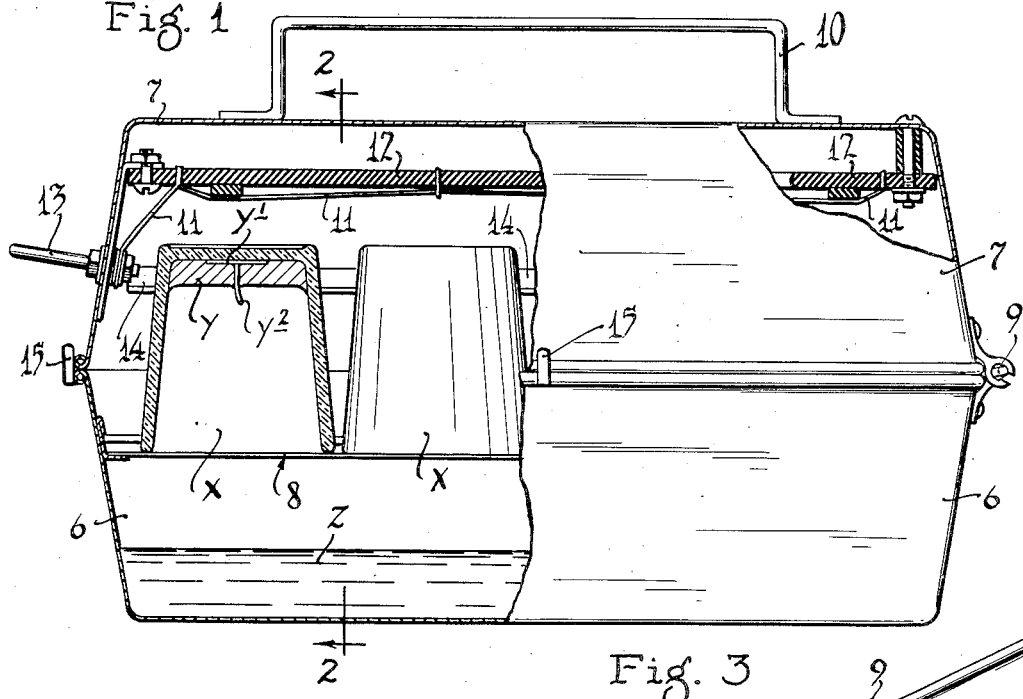
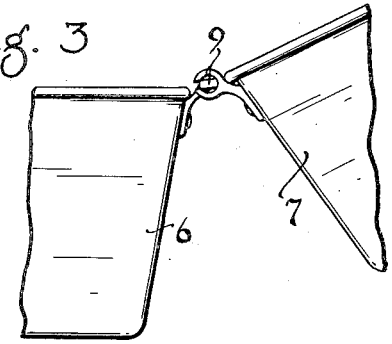
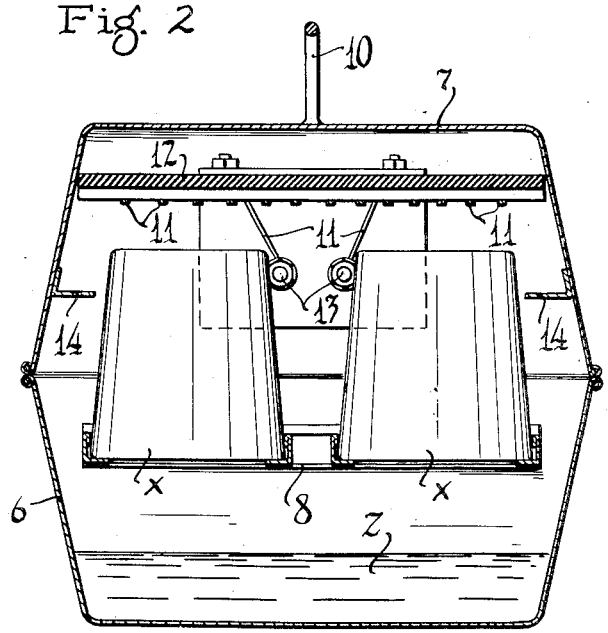
INVENTOR
Clerc A. Gribble
BY HIS ATTORNEYS
Merchant & Kilgore May 19, 1936.  C. A. GRIBBLE  2,041,542
APPARATUS FOR REMOVING CANDLE WAX FROM HOLDERS
Filed Aug. 3, 1934  2 Sheets-Sheet 2

INVENTOR
Clerc A. Gribble
BY HIS ATTORNEYS

Patented May 19, 1936

2,041,542

UNITED STATES PATENT OFFICE 2,041,542

APPARATUS FOR REMOVING CANDLE WAX FROM HOLDERS

Clerc A. Gribble, Minneapolis, Minn.

Application August 3, 1934, Serial No. 738,367

2 Claims. (Cl. 219—19)

My invention has for its object the provision of a simple and highly efficient apparatus for removing the residue wax of burned candles from their holders.

It is well known that certain churches are constantly using large numbers of votive lights which consist of wax candles and glasses or holders therefor. These candles are contained entirely or substantially entirely within their holders and have a snug fit therewith so that during the burning of the candles, the heat therefrom causes the wax to adhere to the sides and bottoms of the holders. In the lower ends of the candles are metallic disc-like wick holders which are left embedded in the residue of wax candles. At present, it is a slow and tedious process to remove the residue of candle wax and the metallic wick holders from the votive glasses.

My invention is especially well adapted for use in quickly and efficiently removing the residue of candle wax and the wick holders from votive glasses or candle holders.

To the above end, generally stated, the invention consists of the novel devices, combinations of devices and arrangement of parts hereinafter described and defined in the claims.

In the accompanying drawings, which illustrate the invention, like characters indicate like parts throughout the several views.

Referring to the drawings:

Fig. 1 is a view of the improved apparatus partly in side elevation and partly in central vertical section;

Fig. 2 is a view principally in transverse vertical section taken on the line 2—2 of Fig. 1;

Fig. 3 is a fragmentary detail view in outside elevation showing the cover open;

Figure 4:
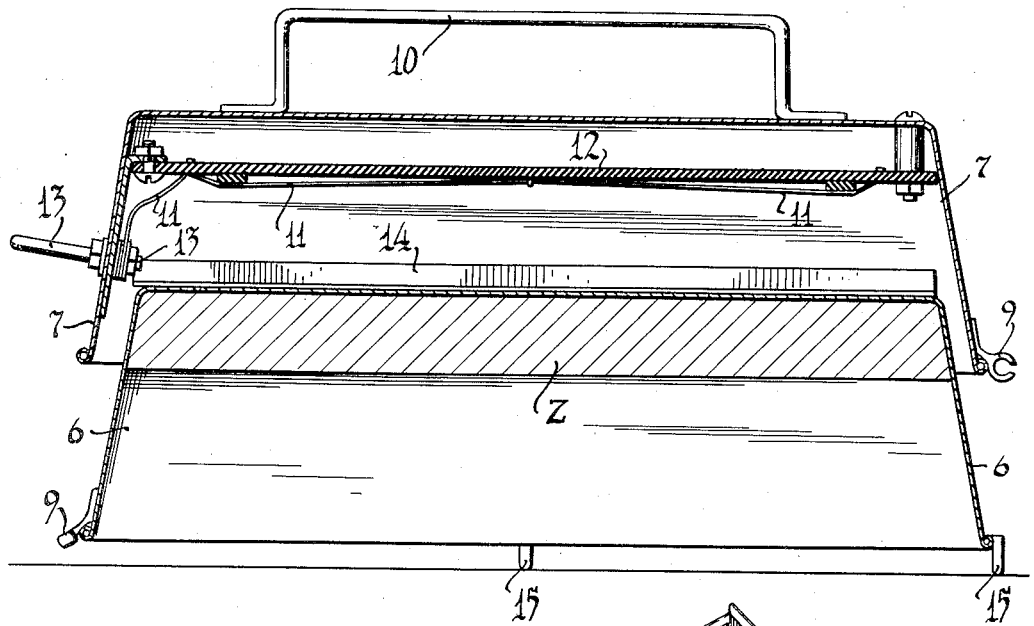
Fig. 4 is a view of the improved apparatus in longitudinal central section showing the receptacle inverted and the cover applied to the bottom thereof in capping relation.
Figure 5:
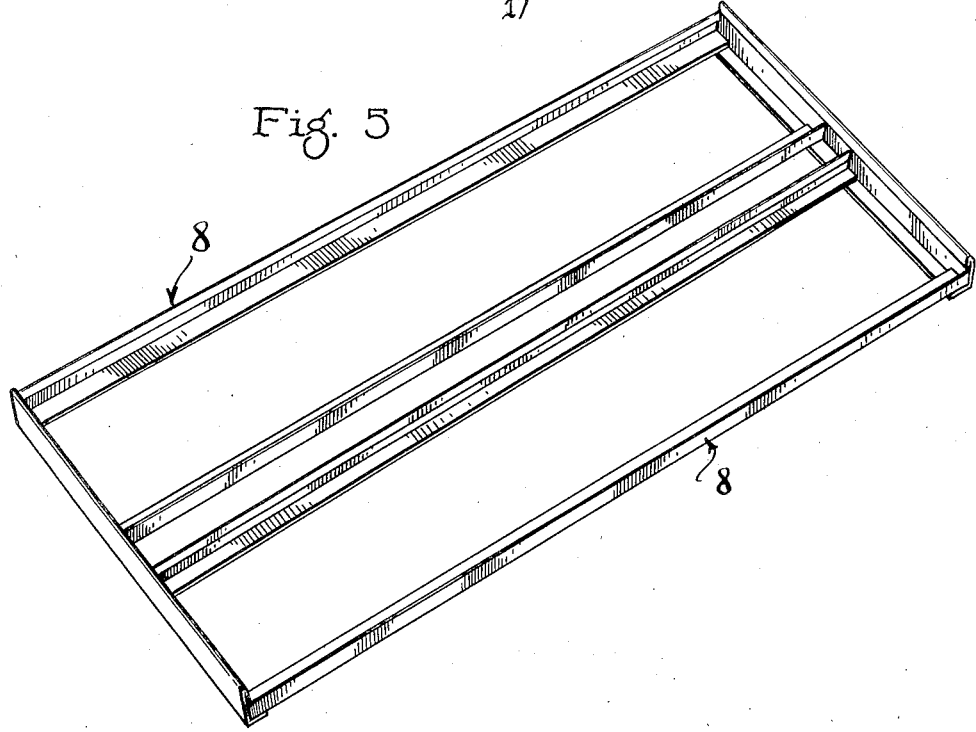
Fig. 5 is a view of the rack removed from the receptacle.

The numeral 6 indicates a rectilinear pan-like receptacle having flaring end and side walls, and the numeral 7 indicates a cover for said receptacle. This cover 7, as shown, is substantially a duplicate of the receptacle 6, except that it is inverted and, when closed, its rim rests on the rim of the receptacle 6.

Within the receptacle 6 is a rack 8 which includes two pairs of laterally spaced rails arranged to support a plurality of votive glasses $x$, or broadly speaking, candle holders, in two rows which extend longitudinally in the receptacle 6. It will be noted that the rack 8 rests at its ends on the flaring end walls of the receptacle 6 and supports said rack above the bottom of said receptacle and holds the votive glasses $x$ thereon inverted with their bottom portions extending into the cover 7, when closed. A separable hinge 9 detachably connects the cover 7 at one of its ends to the receptacle 6. On top of the cover 7 is a handle 10 by which said cover may be opened or closed.

The heating element 11 in the cover 7 is mounted on an insulated plate 12 secured to said cover. Fixed to the free end of the cover 7 is a pair of outwardly projecting plug contacts 13 to which the ends of the heating element 11 are attached. These plug contacts 13 are arranged to receive and hold the plug terminal, not shown, of an electric light wire leading from a suitable source of supply.

On the inner faces of the sides of the cover 7 is a pair of flanges 14 arranged to rest on the bottom of the receptacle 6 when inverted as shown in Fig. 4, and support the cover 7 in capping relation with said receptacle. Upstanding pins 15 on the rim portion of the receptacle 6, together with the hinge 9, hold the cover 7 against shifting movement on the receptacle 6 in a horizontal plane.

Within the votive glass $x$ at the time it is placed inverted on the rack 8 within the receptacle 6 is the residue of candle wax $y$, a disc-like holder $y^1$, and a portion of the wick $y^2$ of a burned candle attached to said holder.

To clean votive glasses (it, of course, being assumed that the plug contacts 13 are electrically connected to a suitable source of supply, and the receptacle 6 heated to proper temperature by the heating element 11) they are placed inverted on the rack 8 and the rails of said rack hold the votive glasses $x$ against lateral shifting movement transversely of the rack 8. After the votive glasses $x$ have been in the receptacle long enough to start the melting of the wax $y$ sufficiently to release the same from the glasses $x$, said wax, together with the wick-holder $y^1$ and the wick $y^2$ will be precipitated through the rack 8 and onto the bottom of the receptacle 6. All of the melted wax adhering to the votive glasses $x$ will flow therefrom, thus leaving said glasses perfectly clean. The precipitated wax, after the same has congealed, will form a cake $z$ in the receptacle 6 and this cake, in turn, adheres to the internal surfaces of said receptacle.

Prior to the removal of the cake $z$ from the receptacle 6, the rack 8 is removed therefrom and thereafter the hinge 9 is separated to remove the cover 7 from the receptacle 6.

To remove the cake z from the receptacle 6, the receptacle is inverted and the cover 7 placed on the bottom thereof in capping relation, and with its flanges 14 resting on the bottom of said receptacle to support the cover 7 therefrom with the heating element 11 out of contact therewith. With the cover 7 thus applied, heat from the heating element 11 on the exterior of the receptacle 6 will soon melt the cake z sufficiently to cause the same to release from the receptacle 6 and be precipitated.

It will be understood that the invention described is capable of various modifications within the scope of the invention herein disclosed and claimed.

What I claim is:

1. In an apparatus of the class described, a receptacle having flaring internal side walls, an inverted pan-like cover for the receptacle, a heating element mounted in the cover, and a rack removably supported on the side wall of the receptacle, said rack being constructed and arranged to support an inverted candle holder below the heating element, whereby the holder will be externally heated to precipitate the residue of wax therein into the receptacle where said residue of wax is formed into a cake, said cover being displaceably applied to the receptacle, whereby said cover may be externally applied to the bottom of the receptacle, when inverted, in capping arrangement to externally heat the receptacle and thereby precipitate the cake of wax therein.

2. In an apparatus of the class described, an invertible receptacle, a displaceable supporting rack in the receptacle, an inverted pan-like cover displaceably applied to the receptacle, a heating element in the cover, and means in the cover for supporting said cover on the receptacle, when said receptacle is inverted, with the side walls of the cover and the receptacle spaced, the one from the other.

CLERC A. GRIBBLE.